United States Patent [19]

Christensen et al.

[11] Patent Number: 5,055,926
[45] Date of Patent: Oct. 8, 1991

[54] VIDEO IMAGE POSITION DETERMINATION

[75] Inventors: Wynn Christensen, Los Alamos; Forrest L. Anderson, Bernalillo; Birchard L. Kortegaard, Los Alamos, all of N. Mex.

[73] Assignee: The United States of America as represented by the United States Department of Energy, Washington, D.C.

[21] Appl. No.: 502,959

[22] Filed: Apr. 2, 1990

[51] Int. Cl.$^5$ ............................................. H04N 7/18
[52] U.S. Cl. .................................. 358/125; 358/105; 382/18; 356/152
[58] Field of Search ............... 358/125, 105, 108, 103, 358/126; 382/18, 25; 356/152

[56] References Cited

U.S. PATENT DOCUMENTS

| | | | |
|---|---|---|---|
| 3,541,246 | 11/1970 | Goldfischer | 358/125 |
| 3,953,670 | 4/1976 | Prince | 358/125 |
| 4,004,083 | 1/1977 | Norem | 358/125 |
| 4,710,957 | 12/1987 | Bocci et al. | 380/42 |
| 4,958,224 | 9/1990 | Lepore et al. | 358/126 |

OTHER PUBLICATIONS

F. Anderson, W. Christiansen, B. Kortegaard, "Real Time, Video Image Centroid Tracker," Apr. 16–20, 1990.

B. L. Kortegaard, "PAC-MAN, a Precision Alignment Control System for Multiple Laser Beams Self-Adaptive Through the Use of Noise," Los Alamos National Laboratory, date unknown.

B. L. Kortegaard, "Superfine Laser Position Control Using Statistically Enhanced Resolution in Real Time," Los Alamos National Laboratory, SPIE—Los Angeles Technical Symposium, Jan. 23–25, 1985.

*Primary Examiner*—John K. Peng
*Attorney, Agent, or Firm*—Milton D. Wyrick; Paul D. Gaetjens; William R. Moser

[57] ABSTRACT

An optical beam position controller in which a video camera captures an image of the beam in its video frames, and conveys those images to a processing board which calculates the centroid coordinates for the image. The image coordinates are used by motor controllers and stepper motors to position the beam in a predetermined alignment. In one embodiment, system noise, used in conjunction with Bernoulli trials, yields higher resolution centroid coordinates.

12 Claims, 10 Drawing Sheets

VIDEO IMAGE POSITION DETERMINATION

BACKGROUND OF THE INVENTION

The present invention generally relates to the control of video and optical information and, more specifically, to control systems utilizing video images to provide control. The invention is a result of a contract with the Department of Energy (Contract No. W-7405-ENG-36).

Accurate control of video images and laser beams is becoming increasingly important as the use of lasers for machine, medical and experimental processes escalates. In, AURORA, an installation at Los Alamos National Laboratory dedicated to laser fusion research, it is necessary to precisely control the path and angle of up to 96 lasers beams.

In the past, video and laser beam control has largely been accomplished by electromechanically controlled mirrors moved in response to electrical signals from simple beam sensing detectors. However such systems are not satisfactorily accurate or practical for rapid fine angular control of a large number of laser teams. The laser beams at Los Alamos require angular pointing accuracy of up to 0.25 microradians. All 96 of the Los Alamos laser beams must be aligned simultaneously at three different closed loop control systems located at different points along the beam paths. This alignment must be done rapidly and, with at least one control system, in near real time.

The present invention provides such positional and angular beam sensing accuracy through real time determination of the centroid of the laser beam image in the video information captured by a conventional television camera, using random system noise to greatly enhance resolution of the centroid, and uses the centroid coordinates as feedback information in positioning the laser beam. It can provide 0.25 microradian angular beam pointing accuracy for a single beam within 33 ms in real time. Other than beam control, the present invention can find application in pick and place robot arm control, military target tracking and pointing, intruder localization and, in general, very high resolution, real time image position tracking.

It is therefore an object of the present invention to provide apparatus for precise real-time control of processes represented by video information;

It is a further object of the present invention to provide closed loop control system positioning apparatus which will respond to 0.25 microradian angular variations of a single laser beam represented by a video image.

It is a still further object of the present invention to use random noise to determine video image centroids at an accuracy of better than 0.004 pixels in real time.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise interface means connected to a video camera for outputting a video image as pixels having determinable coordinates and magnitudes. Magnitude determining means are connected to the interface means for determining maximum, minimum, and average pixel magnitudes for the pixels within video frames, and threshold calculating means are connected to the magnitude determining means for determining a threshold pixel magnitude from the maximum, minimum, and average pixel magnitudes. Comparison means are connected to the interface means and to the threshold calculating means for comparing each of the pixel magnitudes with the threshold pixel magnitude, and outputting coordinates of beam pixels whose magnitudes exceed the threshold pixel magnitude. Pixel coordinate summing means receive the coordinates of beam pixels for summing the coordinates of beam pixels. Pixel area summing means receive the beam pixels for counting the beam pixels to determine a total area covered by the beam pixels. And calculating means receive the total area and the sum of beam pixels whose magnitudes exceed the threshold pixel magnitude for calculating centroid coordinates for the total area.

In a further aspect of the present invention, and in accordance with its objects and purposes a method of determining the position of an optical beam wherein a video camera captures an image of said beam in video frames comprises the steps of receiving and outputting the video images from the video camera as pixels having determinable coordinates and magnitudes; determining maximum, minimum, and average pixel magnitudes for the pixel within the video frames; determining a threshold pixel magnitude from the maximum, minimum, and average pixel magnitudes; comparing each of the pixel magnitudes with the threshold pixel magnitude and outputting coordinates of beam pixels whose magnitudes exceed the threshold pixel magnitude; summing the coordinates of the beam pixels; summing the beam pixels to calculate a total area of the beam pixels; and calculating centroid coordinates of the video image by dividing the sum of coordinates of beam pixels by the total area of the beam pixels.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
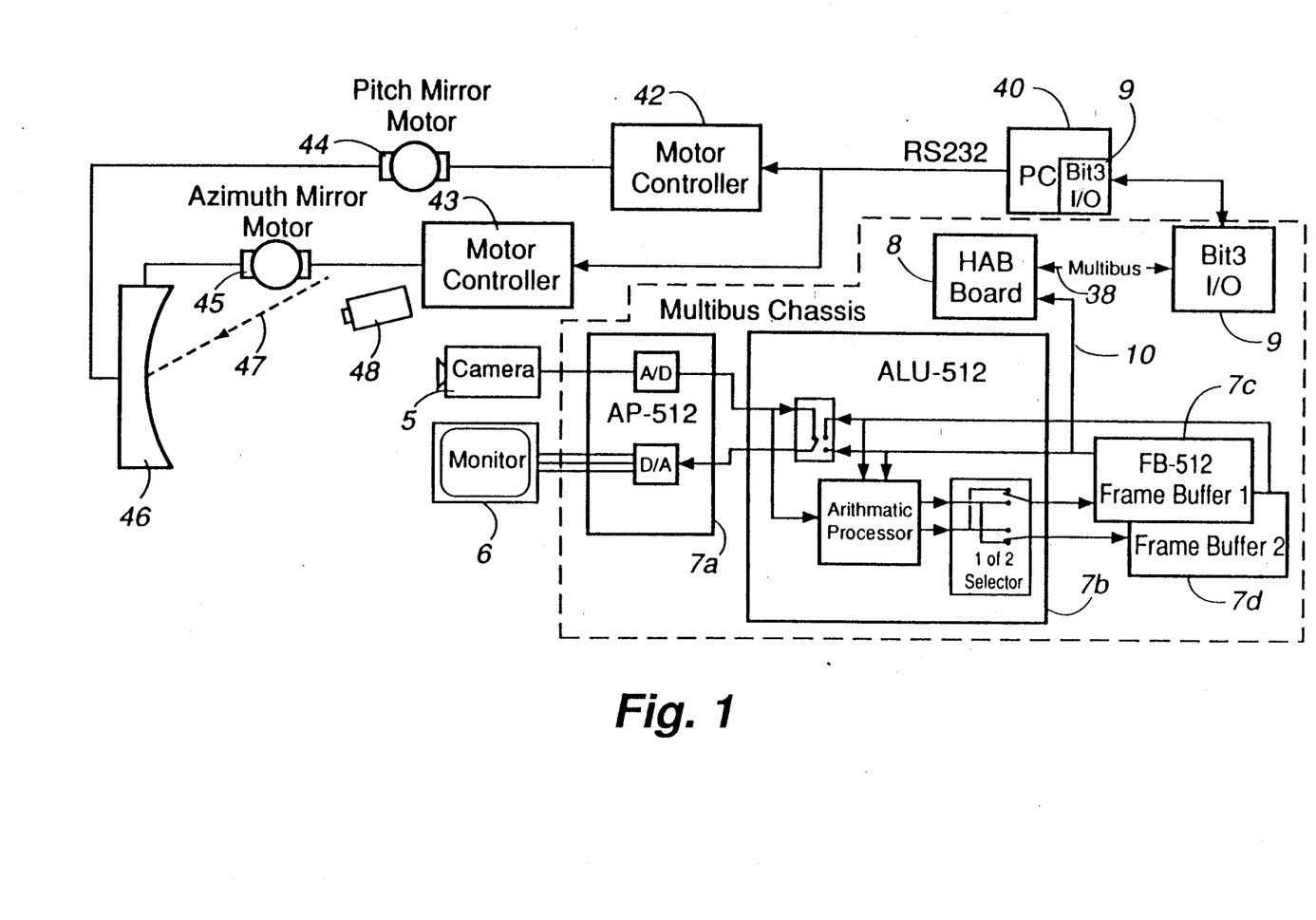
FIG. 1 is a block diagram of the overall invention, including the video capture input to the present invention, as well as the overall connection and control for beam alignment.

The present invention provides video position determination, as well as positioning of laser beams responsible for video images through calculation of the centroid of the beam image and the moving of the laser beams responsible for the images to a predetermined position within a video frame. In FIG. 1, a block diagram of the input and beam control sections of the present invention is illustrated. The input section is enclosed within dashed lines. Shown are video camera 5 a RS170 TV camera, and video processing boards 7a, 7b, 7c, and 7d. Also shown is monitor 6. Video processing boards 7a, 7b, 7c, and 7d are commercially provided by Imaging Technology, Inc. (ITI) 600 West Cummings Park, Woburn, Mass. 01801. The multibus backplane to which these boards are fully described in INTEL Application Note AP-28A, January, 1979. The video data from camera 5 is digitized by video processing board 7a at the rate of 10 MHz. As output, this equipment provides horizontal sync, vertical sync, horizontal blank, vertical blank, field, 8 bit pixels and dot clock signals to hardware algorithm board which contains the main processors of the current invention, on digitized video data bus 10. The other components illustrated in FIG. 1 will be discussed below.

Figure 2:
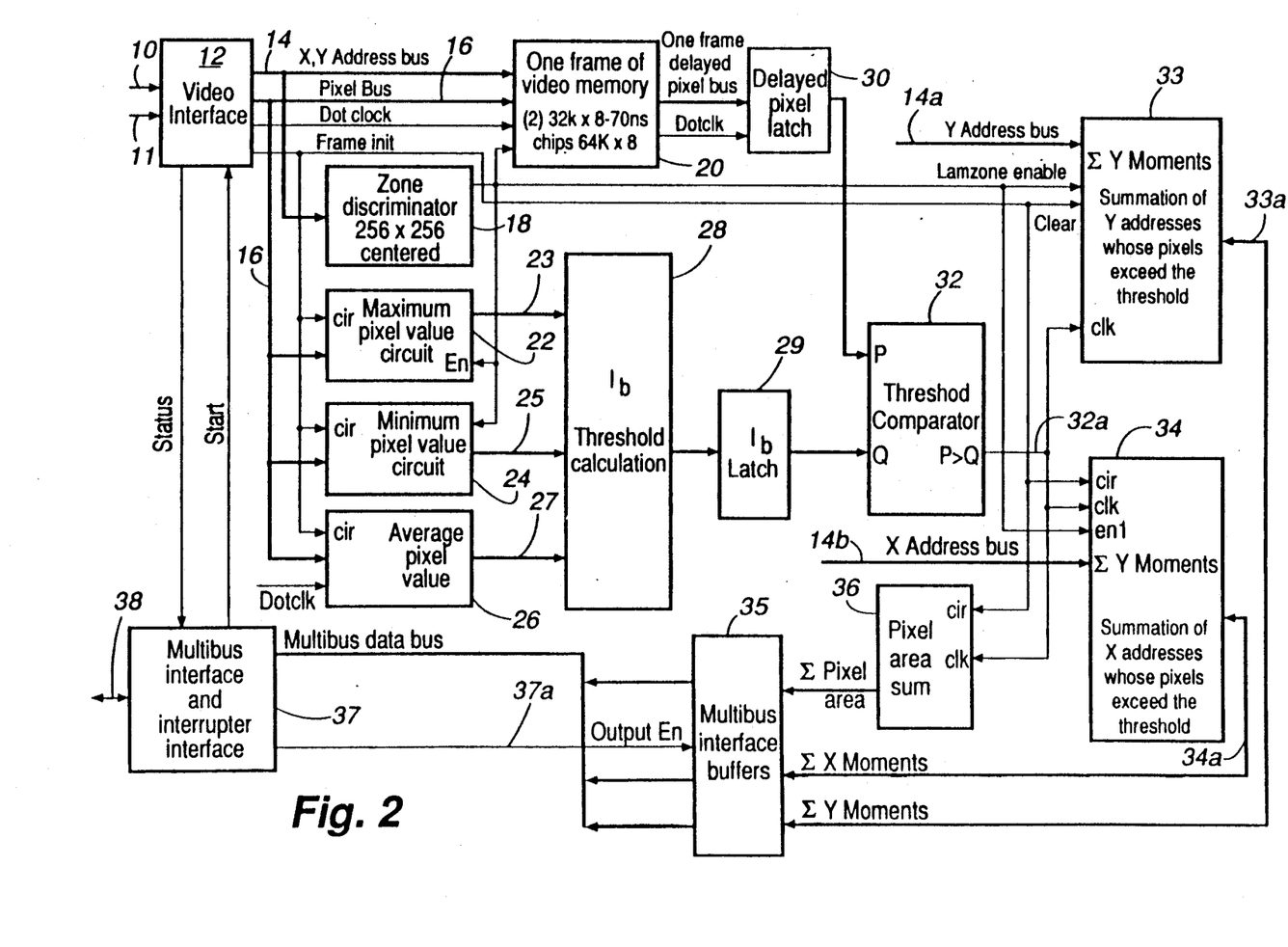
FIG. 2 is a block diagram of the functional operations of the hardware algorithm board of the present invention.

Referring now to FIG. 2, digitized video data bus 10 containing horizontal sync, vertical sync, horizontal blank, vertical blank, field bit (odd, even field), 8 bit pixels and dot clock signals from the ITI boards of FIG. 1, is input to video interface 12 on hardware algorithm board 8, the main processing board of the present invention. Multibus init signal 11, which originates on power up initializes video interface 12. Video interface 12 is designed to interface with the ITI multibus video processing boards 7a, 7b, 7c, and 7d through the Imaging Technology, Inc. video bus (not shown).

Figure 3:
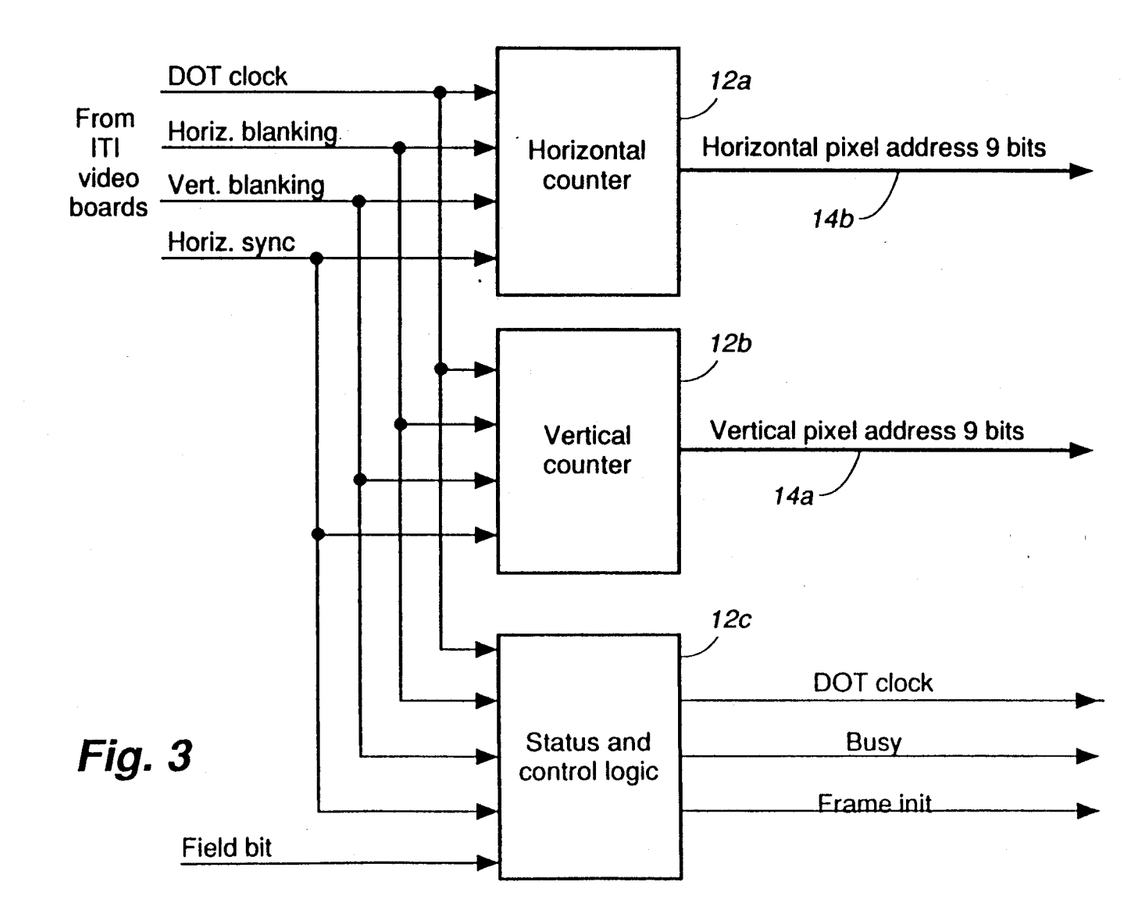
FIG. 3 is a block diagram of the video interface portion of the present invention.

Video interface 12, which is a custom designed chip implemented on an Altera 1800 J programmable logic device, is more fully illustrated in FIG. 3. In FIG. 3 the signals on digitized video data line 10 are input into horizontal counter 12a, to vertical counter 12b, and to status and control logic circuit 12c. Also input to status and control logic circuit 12c is field bit line 15. Horizontal counter 12a outputs horizontal pixel (X) address line 14b. Vertical counter 12b outputs vertical pixel (Y) address line 14a. Status and control logic circuit 12c outputs dot clock, busy, and frame init signals.

Returning now to FIG. 2, it can be seen that horizontal pixel (X) address line 14b and vertical pixel (Y) address line 14a are formed from X, Y address bus 14 output from video interface 12. X, Y address bus 14 contains an address system in Cartesian coordinates with 9 bits horizontally and 9 bits vertically indicating the addresses representative of the X and Y coordinates of the pixels contained within digitized video data 10. Video interface 12 also synchronizes the system so that analysis begins on the trailing edge of the vertical blanking signal contained in digitized video data 10, and ends at the leading edge of the vertical blanking signal, two fields later (the odd and even fields). This period allows approximately 1.4 ms (during vertical blanking) for accomplishing necessary read functions, and for completion of the division calculation required to yield the final coordinates of the centroid. This division operation will be more fully discussed below.

X, Y address bus 14 is connected to one frame of video memory memory 20, and to zone discriminator 18. Additionally, Y address bus 14a is provided to sum of Y moments 33, and X address bus 14b is provided to sum of X moments circuit 34. Zone discriminator 18 blocks out video signals for all areas except for a 256×256 pixel area (active window) in the center of a frame of digitized video data 10. Two 512×8 bit PROMS determine whether or not digitized video data 10 is within this active window. One frame of video memory 20 delays the pixels for one video frame and outputs the delayed pixels in the active window to delayed pixel latch 30, before they are output to threshold comparator 32. Threshold comparator 32 compares the magnitude of each pixel with a precalculated threshold magnitude, as is more fully described below.

Video interface 12 also outputs pixel bus 16, which contains all of the pixel information supplied in digitized video data 10, including the value of the intensity value of each pixel. Pixel bus 16 is supplied to one frame of video memory 20, to maximum pixel value circuit 22, to minimum pixel value circuit 24, and to average pixel value circuit 26.

Maximum pixel value circuit 22 determines and captures the maximum pixel value in the active window determined in zone discriminator 18. Maximum pixel value circuit 22 is more easily understood by referring to FIG. 4. As seen, pixel bus 16 (FIG. 2) is connected to digital comparator 22a and to max pixel latch 22b. Multibus init pulse 11 clears max pixel latch 22b at the beginning of a video frame. As pixels arrive, each is compared in digital comparator 22a to the current maximum pixel value stored in max pixel latch 22b. Whenever an incoming pixel exceeds the maximum value then in latch 22b, a clock pulse is enabled by latch logic circuit 22c at the clock input of latch 22b, and the new maximum pixel value is latched. The new maximum value is then the standard by which later arriving pixels in the active window are judged. Maximum pixel value output line 23 is output from max pixel latch 22b and connects to threshold calculation 28 (FIG. 2).

Figure 4:
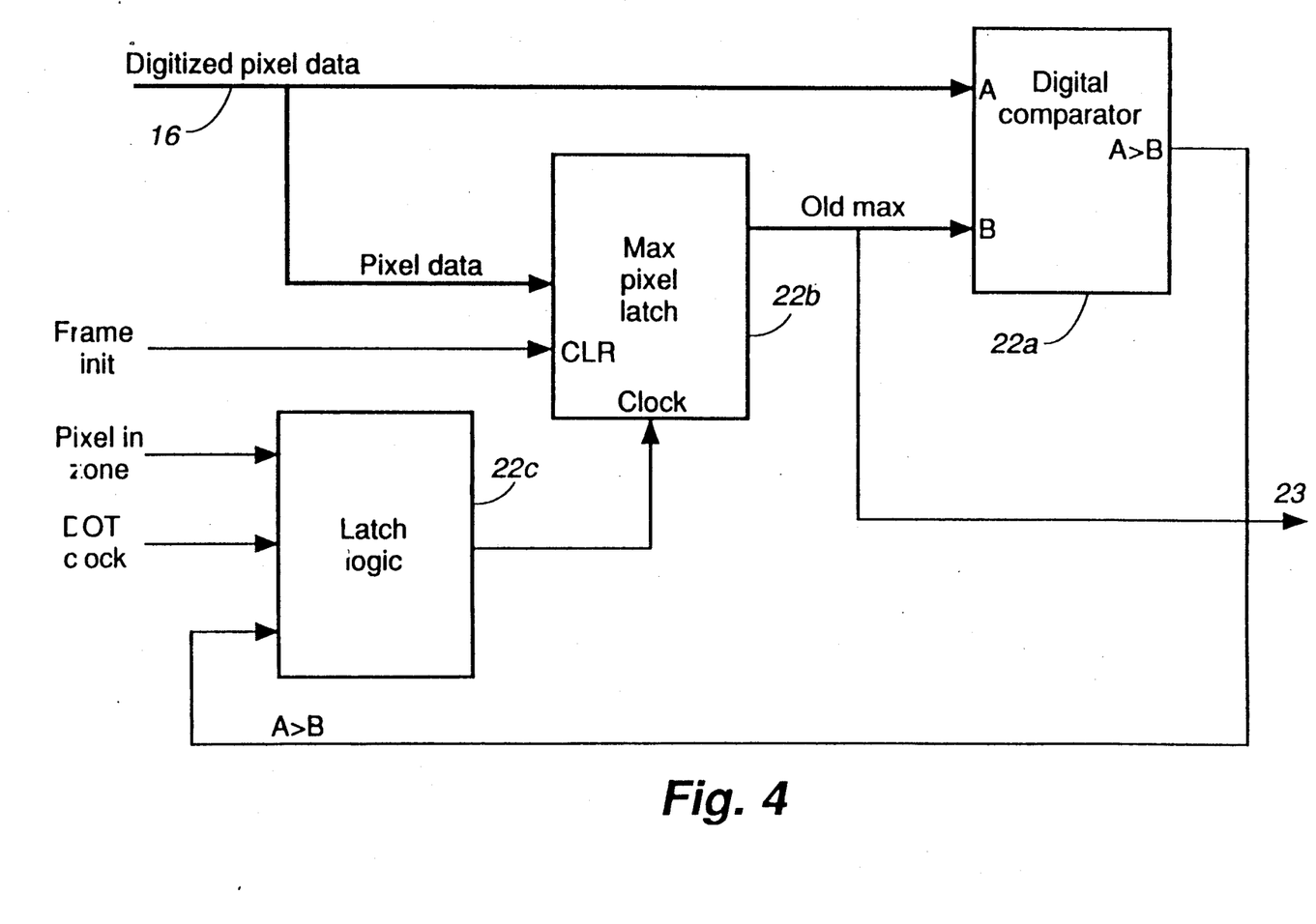
FIG. 4 is a block diagram of the maximum pixel value circuit portion of the present invention.
Figure 5:
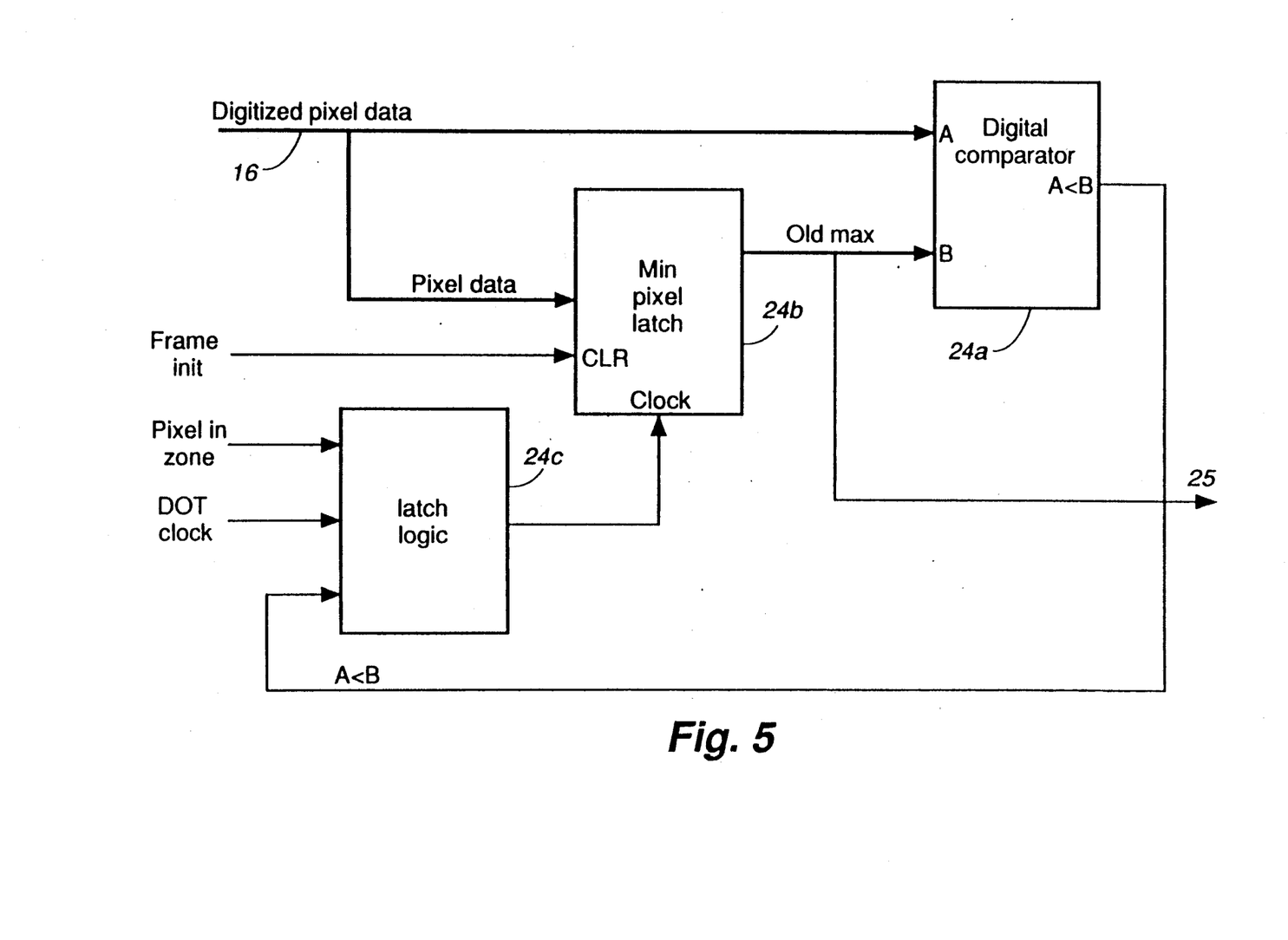
FIG. 5 is a block diagram of the minimum pixel value circuit portion of the present invention.

Referring back to FIG. 2, it is seen that in similar fashion, minimum pixel value circuit 24 also receives pixel bus 16, and captures the minimum pixel value in the stream of pixels contained in pixel bus 16. As seen in FIG. 5, minimum pixel value circuit 24 is identical to maximum pixel value circuit 22 (FIG. 4). If a pixel in the stream on digitized pixel data line 16 has a value less than the current minimum stored in min pixel latch 24b, as determined in digital comparator 24a, a clock pulse is enabled through latch logic 24c and onto the clock input of latch 24b, latching the new minimum pixel value. Latch 24b is an inverting register that has a preset input. This allows presetting the address of the maximum register by the Multibus init pulse 11. An inverter (not shown) inverts the data, allowing it to be compared with the incoming pixel data on pixel bus 16. Minimum pixel value output line 25 is output from min pixel latch 24b, and is connected to threshold calculation 28 (FIG. 2).

Reference should again be made to FIG. 2. Pixel average value circuit 26 also receives input from digitized pixel data bus 16, and finds the average value of all pixels in the active window. This is another value used in producing a threshold pixel value. This circuitry comprises 3 latching registers, 6 four bit summers, a multibus interface chip, and one gate (not shown). Pixel average value circuit 26 adds the present pixel value to the present sum and latches the new sum. At the end of the frame, the average value is extracted by dividing the number of pixels in the area, 65,536, implemented by using only the eight (8) most significant bits of the 24 bits in the three latching registers. Its output is also supplied to threshold calculation 28 on average pixel value line 27.

Figure 6:
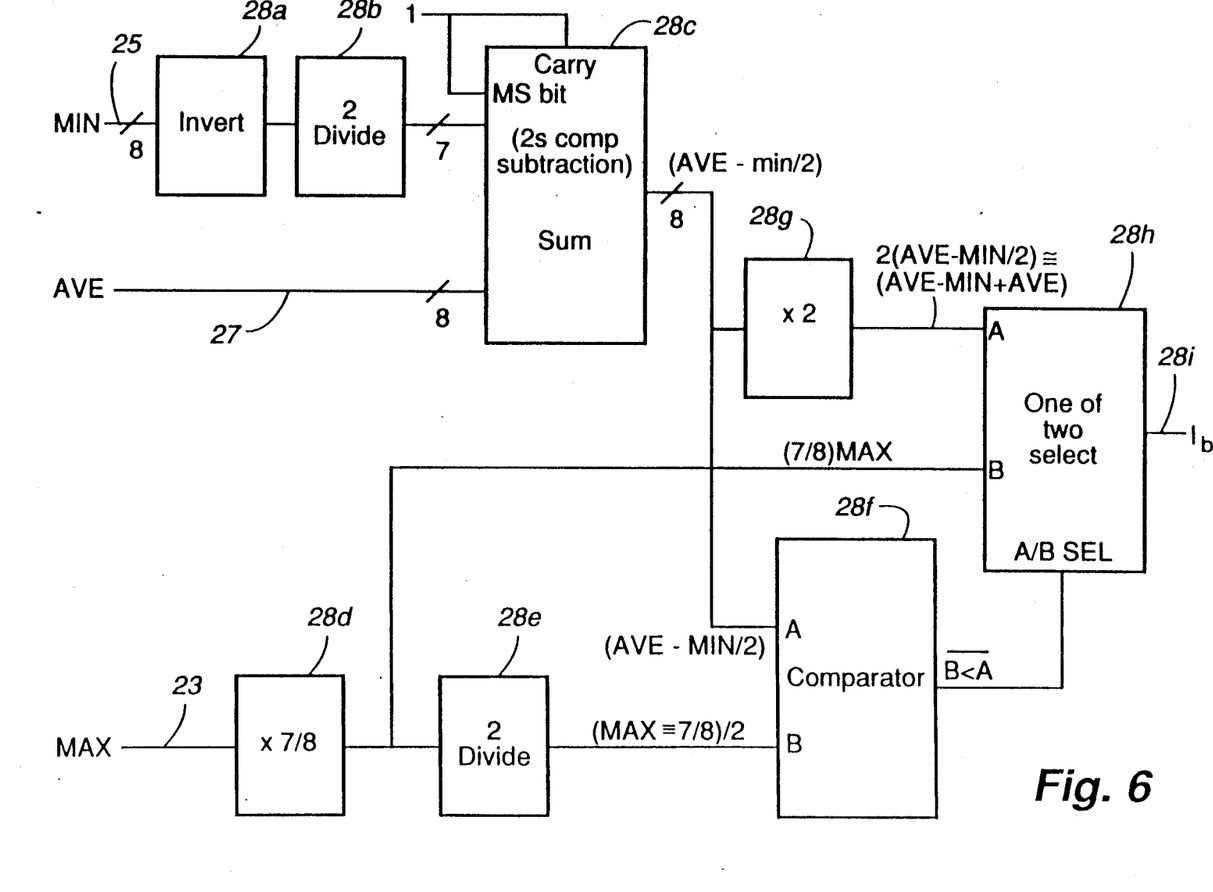
FIG. 6 is a schematic diagram of the sum of x moments circuit of the present invention.

Threshold calculation 28 is one component in implementation of an algorithm for calculating the centroid of a two dimensional object or image. The implementation of this algorithm is illustrated in FIG. 6. As shown, pixels on minimum pixel value output line 25, from minimum pixel value circuit 24 (FIG. 2), are inverted by invert circuit 28a and divided by 2 by divide circuit 28b prior to being input to summer 28c. Average pixel value output line 27 is also input to summer 28c. This yields an output from summer 28c of the average pixel value less one-half ($\frac{1}{2}$) the minimum pixel value (average value-minimum value/2). This sum is output to multiply $\times 2$ circuit 28g and to comparator 28f.

Multiply $\times 2$ circuit 28g has an output of 2(average value-minimum value/2) which is approximately equal to (average value-minimum value) +average value. This output is provided to one of two select circuit 28h.

Maximum pixel value output line 23 from maximum pixel value circuit 22 is input into multiply $\times \frac{7}{8}$ circuit 28d. The output of multiply $\times \frac{7}{8}$ circuit 28d is connected to one of two select circuit 28h, and to divide by 2 circuit 28e. The output of divide by 2 circuit 28e, being (maximum value $\times \frac{7}{8}$)/2, is input to comparator 28f, where the lesser value between (average value-minimum value/2) and (maximum value $\times \frac{7}{8}$)/2 is determined, and the lesser value is output to one of two select circuit 28h.

In one of two select circuit 28h, the input from comparator 28f selects the lesser of (average value – minimum value)+average value or (maximum value $\times \frac{7}{8}$) and outputs that value the threshold value) on output line 28i to latch 29 (FIG. 2). Latch 29 retains the current threshold value until the next frame update, and provides the current threshold value to threshold comparator 32.

Mathematically, the coordinates of a centroid are given by the following expressions:

$$X_c = \int (x) f(x,y) dx dy / \int f(x,y) dx dy \qquad 1$$

$$Y_c = \int (y) f(x,y) dx dy / \int f(x,y) dx dy \qquad 2$$

where $X_c$ and $Y_c$ are the centroid coordinates and f(x,y) is the function defining the two dimensional object or image. In discrete form, the equations can be rewritten as follows:

$$X_c = \Sigma(X_i) f(X_i, Y_j) / \Sigma f(X_i, Y_j) \qquad 3$$

$$Y_c = \Sigma(Y_j) f(X_i, Y_j) / \Sigma f(X_i, Y_j) \qquad 4$$

where $X_i = X_1, X_2, \ldots X_n$, and $Y_j = Y_1, Y_2, \ldots Y_m$, for an m x n pixel image.

For purposes of the present invention, the image function, f(x,y), is converted into a binary function, F(x,y), which takes on only the values zero or one, depending on whether f(x,y) is greater than some threshold value, $I_b$. This allows equations 1 and 2 to be written as:

$$X_c = \Sigma(X_i) F(X_i, Y_j) / \Sigma F(X_i, Y_j) \qquad 5$$

$$Y_c = \Sigma(Y_j) F(X_i, Y_j) / \Sigma F(X_i, Y_j) \qquad 6$$

where $$F(X_i, Y_j) = 1 \text{ if } f(X_i, Y_j) \geq I$$
$$= 0 \text{ if } f(X_i, Y_j) < I$$

Equations 5 and 6 are the basis for the hardware implemented algorithm by which the sum of X and Y moments are computed in sum of X moments circuit 34 and sum of Y moments circuit 33 (FIG. 2). The terms, X moments and Y moments, refer to the numerators of equations 5 and 6, which, because each pixel now has a value of either "0" or "1," are the X and Y sums of the X and Y pixel coordinates, for all pixel coordinates where $f(X,Y) \geq I_b$.

The statistical enhancement of the centroid resolution, beyond that given by equations 4 and 5, is accomplished from the facts that there is considerable noise created from such things as jitter in RS170 video camera 5 (FIG. 1), causing slight movement of a pixel's location from frame to frame, and that the numerators and denominators of equations 5 and 6, taken separately, are linear. This linearity can be easily shown. This allows the separate summing over consecutive image frames of the numerator and denominator, with subsequent off board division in processor 40 (FIG. 1) to arrive at a centroid coordinate. In contrast, the centroid computation, taken as a whole, is not linear. This means that merely averaging the computed centroid coordinates over time does not lead to a correct result, and certainly does not provide the same form of statistical resolution enhancement as is used with the present invention.

In fact, an average of the centroid coordinates, of a Finite Impulse Response (FIR) filter applied to a time sequence of centroid measurements, does does not lead to a properly computed centroid measurement. Because the centroid operation is non-linear, the various terms in the sequence interact, causing error in the final result. This can be shown through analysis of the following equations:

$$X_m(f_1(x,y))/\text{area }(f_1(x,y) + X_m(f_2(x,y))/\text{area}(f_2(x,y)) = \qquad 7$$

$$[\text{area}(f_2(x,y))X_m(f_1(x,y)) + \text{area}(f_1(x,y))X_m(f_2(x,y))]/$$

$$\text{area}(f_1(x,y))\text{area}(f_2(x,y))$$

With statistically enhanced resolution, a FIR filter is applied to the numerator and denominator terms of equations 5 and 6. For example, the FIR filter may simply be a running average of the sum of moments and the area over the previous 512 TV frames. The number of TV frames is adjustable. This has several enhancing effects. the more simple of which include: (1) cancellation of extraneous noise; (2) low pass filtering of noise; and (3) low pass filtering of the uncorrelated high frequency components of the beam jitter.

An additional beneficial effect of statistical enhancement is more complex and is more fully explained in a paper entitled "PAC-MAN,* a Precision Alignment Control System for Multiple Laser Beams Self-adaptive Through the Use of Noise" by B. L. Kortegaard, one of the inventors herein, published by Los Alamos National Laboratory as LA-UR-84-4036. That paper is included herein for all purposes. This additional statistical enhancement effect uses the inherent system noise in a beneficial manner to allow higher resolution measurement than would be achieved if the noise were not present. The fundamental concept is that system noise moves the grid of pixels randomly in the x and y directions with respect to the beam creating the video image. This noise created movement, in effect, creates a "virtual image grid" consisting of many more pixels, spaced closer together, allowing higher precision in the beam centroid measurement through Bernoulli trials.

The combination of these enhancement effects, as produced by statistical enhancement, allows an increase in resolution by a factor of ten to one hundred, giving final resolutions of 0.004 to 0.001 pixels.

The statistical enhancement involves a gaussian type distribution of coordinates, requiring statistical analysis (Bernoulli trials). This statistical analysis is in part implemented in threshold comparator 32 (FIG. 2), acting in conjunction with processor 40 (FIG. 1). The binary decision implemented in threshold comparator 32 constitutes a Bernoulli Trial when its results have their effect on the other circuits, particularly on sum of moments circuits 33, 34, and on pixel area sum circuit 36. The cumulative result of a number of Bernoulli Trials is a statistical analysis which produces a centroid resolution with a factor of ten to one hundred improvement over resolutions without noise enhancement.

For the real time hardware which computes the sum of moments terms of the numerators of equations 5 and 6, attention should once again be directed to FIG. 2. In threshold comparator 32, each incoming pixel from delayed pixel latch 30 is compared with the threshold pixel value from latch 29. Whenever a pixel value equals or exceeds the threshold value, threshold comparator 32 produces an output which is an input clock signal to sum of Y moments circuit 33 and to sum of X moments circuit 34. The effect of threshold comparator is to convert the pixel values to digital form, "0" for pixels having values below the threshold, and "1" for pixels equalling or exceeding the threshold. This has the effect of implementing part of one Bernoulli trial.

Using information on the Y coordinate of the pixels from Y address bus 14a, the active 256×256 pixel zone from zone discriminator 18, and the pixels whose values exceed the threshold value determined in threshold calculation 28, sum of Y moments circuit 33 calculates the $\Sigma (Y_i)F(X_i,Y_j)$ term of Equation 6 by adding the Y coordinate to the previously accumulated sum.

Independently, but in parallel with sum of Y moments circuit 33, sum of X moments circuit 34 receives the X coordinate of the pixels from X address bus 14, the active 256×256 pixel zone from zone discriminator 18, and the pixels whose values exceed the threshold value determined in threshold calculation 28, and calculates the $\Sigma (X_i)F(X_i,Y_j)$ term of Equation 5 by adding the Y coordinate to the previously accumulated sum.

Sum of X moments circuit 33 and sum of Y moments circuit 34 make their sums available to multibus interface 37 through interface buffers 35. Pixel area sum circuit 36 calculates the $\Sigma F(X_i, Y_j)$ denominator of Equations 5 and 6, and also makes that sum available to multibus interface 37 through interface buffers 35. Upon receipt of output enable signal 37a from multibus interface 37, these sums are output through multibus interface 37 and control bus 38.

Figure 7:
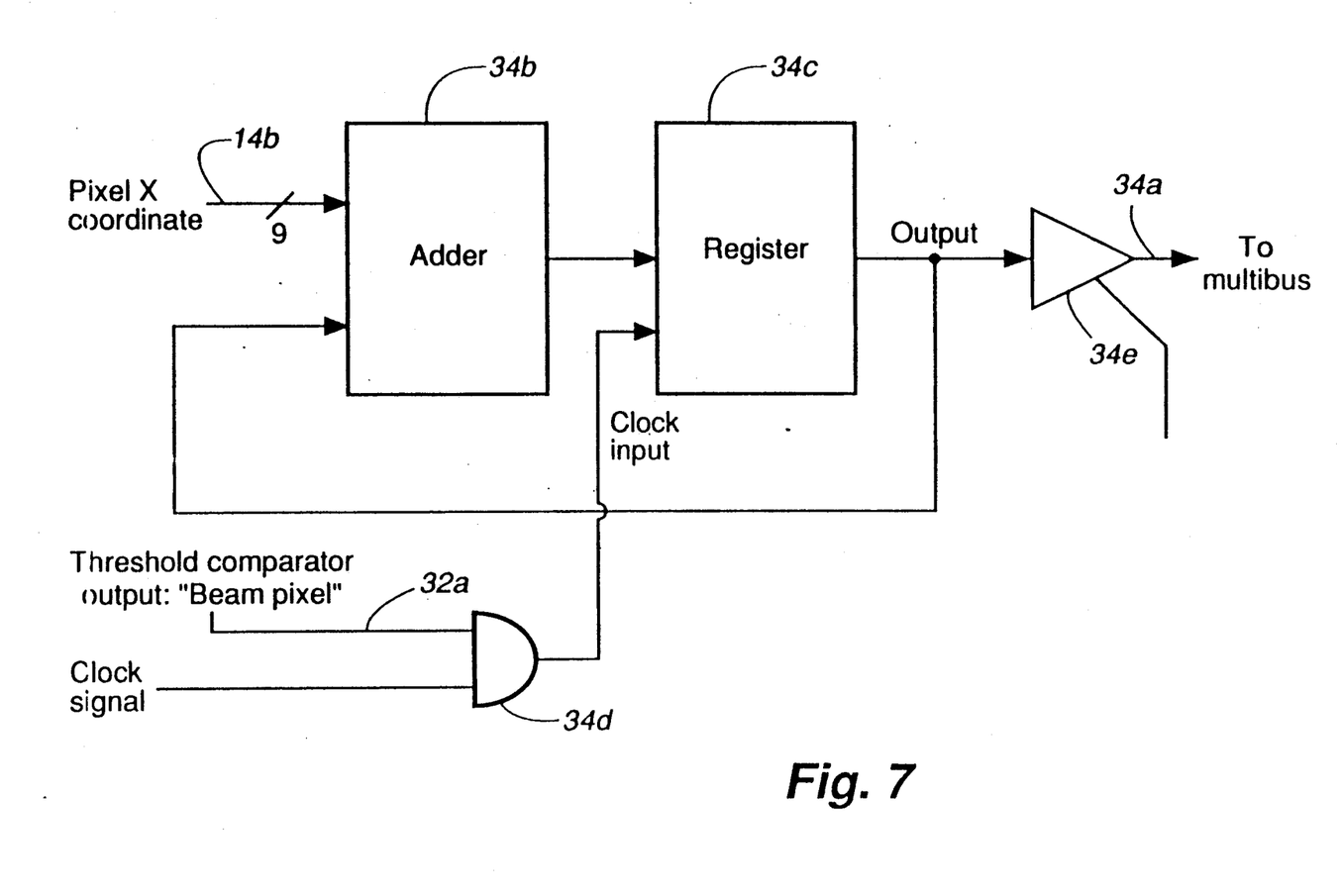
FIG. 7 is is a block diagram of the operations performed in the calculation of the threshold pixel value algorithm utilized in the present invention.

The circuitry for performing these functions in sum of X moments circuit 34 is illustrated in FIG. 7. The circuitry for sum of Y moments circuit 33 is identically configured. As seen, X address bus 14b is input to adder 34b, whose output is stored in register 34c. The output of threshold comparator 32 and clock signal are input to gate 34d, whose output is input to the clock input of register 34c. The output register 34c is provided to adder 34b as the old sum, and as the new sum to line 34a through gate 34e. Line 34a is connected through multibus interface 35 to multibus interface 37 (FIG. 2).

Returning now to FIG. 1, control bus 38 is shown connected between hardware algorithm board 8 and BIT3 I/O 9. BIT3 I/O 9 is oneside of a bus-to-bus interface manufactured by Bit 3 Computer Corporation, 8120 Penn Avenue South, Minneapolis, Minn. 55431-1393. The other side is located on the chassis of processor 40 which may be a PC such as a COMPAQ 386. It is processor 40 which performs the final division of the X and Y moments by the $\Sigma F(X_i,Y_j)$ term calculated in pixel area sum circuit 36, as shown in Equations 5 and 6, to determine the actual $X_c$, $Y_c$ centroid of the object or image.

Figure 8:
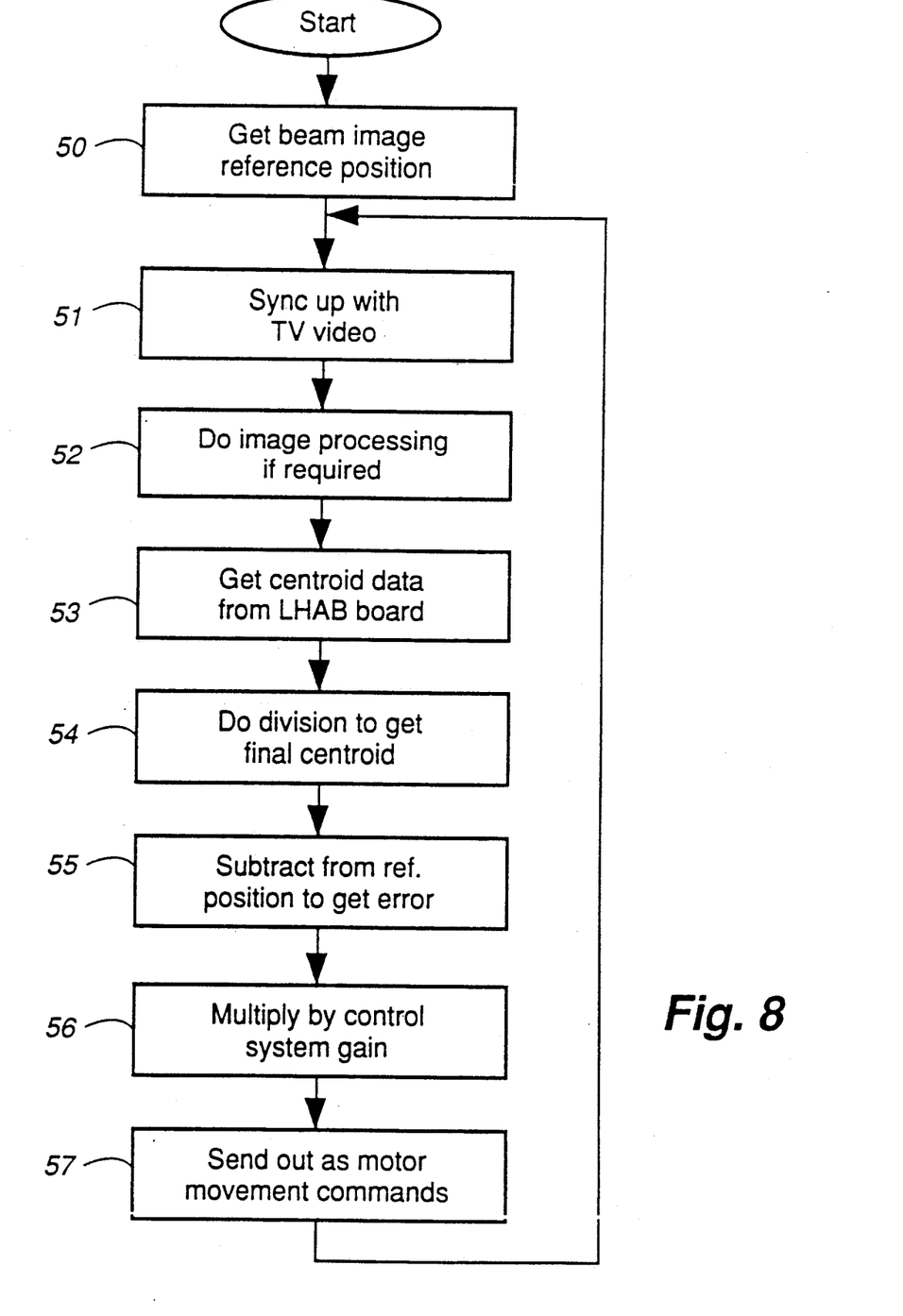
FIG. 8 is a flow chart of the software functions performed in the processor used in the present invention when statistical enhanced resolution is not desired.

A flowchart of the overall operation of the present invention, including the software functions performed in processor 40, is illustrated in FIG. 8 for one frame of video data. After start-up, a beam image reference position is obtained in step 50, followed by synchronization with the video from video processing boards 7a, 7b, 7c, and 7d (FIG. 1), and the performance of any necessary image processing in step 52. Next, centroid data is obtained from hardware algorithm board 8 (FIG. 1) in step 53, and the division of the sum of X and Y moments by the sum of pixel area (equations 5 and 6) is done in step 54 to obtain the current centroid coordinates. In step 55, these current coordinates are subtracted from the reference coordinates obtained in step 50. After these calculations are completed, step 56 multiplies the difference obtained in step 55 by the control system gain, and step 57 outputs signals as movement commands to motor controllers 42, 43 through an RS232 output of processor 40 to correct the position of mirror 46. Motor controller 42 controls pitch mirror motor 44, which alters the pitch position of mirror 46, and motor controller 43 controls azimuth mirror motor 45, which alters the azimuthal position of mirror 46.

Mirror 46 represents the control means for adjusting the angle of the path of a representative beam 47. It is mirror 46 at which camera 5 is focused, as well as alignment laser 48, which simply represents a component of an overall beam control system. This control process repeats every video frame, continuously reducing the error in the position of the beam.

Of course, it is processor 40 which also accomplishes a portion of the Bernoulli trials, as previously explained, to obtain the desired noise enhanced resolution. Without statistically, pixel resolution is approximately 0.04 pixel, a very reasonable resolution. However, with noise enhancement, resolutions of 0.001 pixel, or better, are attainable.

Figure 9:
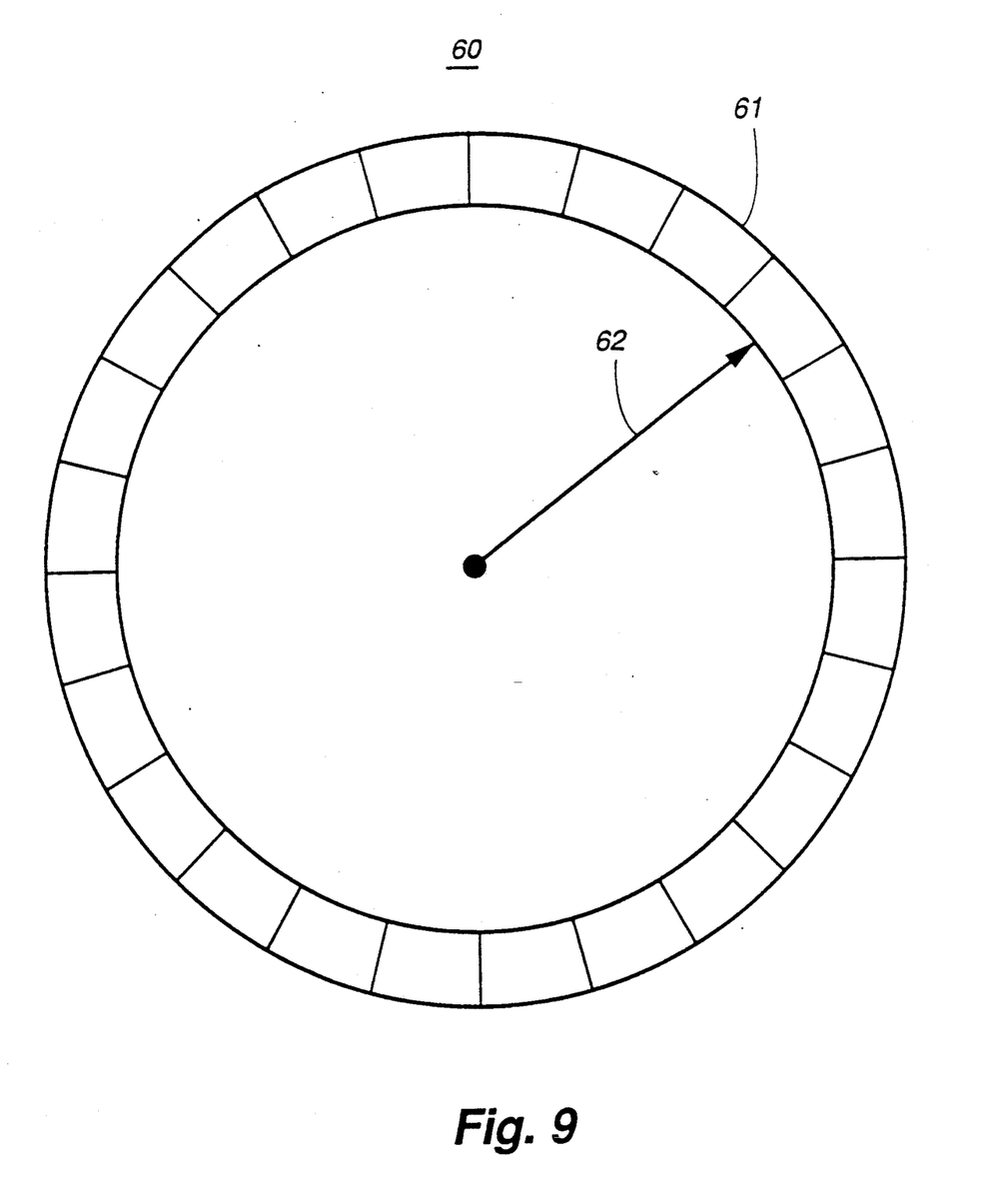
FIG. 9 is a schematic representation of a circular register implemented in software for use in storing data used in the statistically enhanced resolution available with the current invention.
Figure 10:
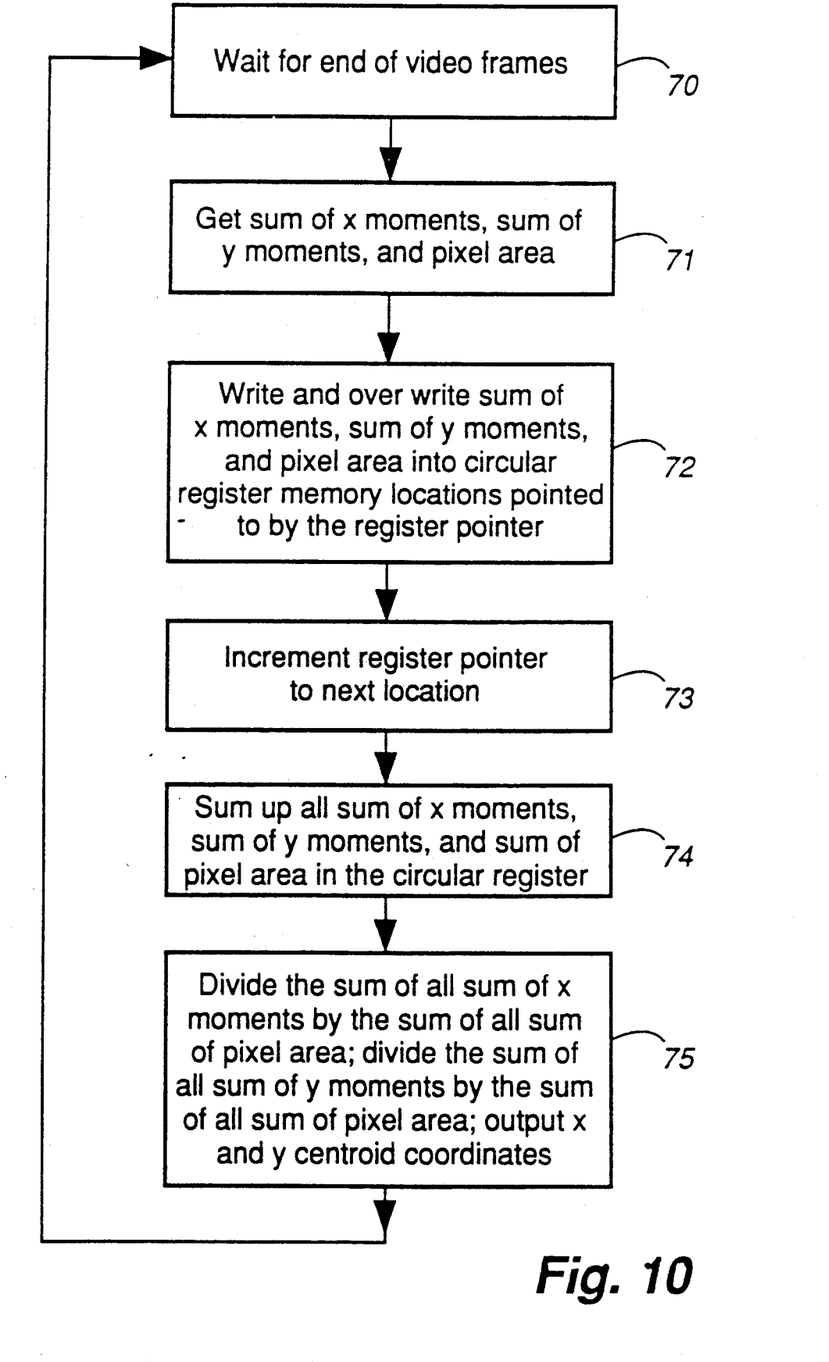
FIG. 10 is a flow chart of the software functions performed in the processor when statistically enhanced resolution is desired.

For a clearer understanding of the software implemented in processor 40 for obtaining the desired noise enhanced resolution, it is helpful to refer to FIGS. 9 and 10. In FIG. 9, a representation of circular register 60 is illustrated for use by the above-described FIR filter and for statistical enhancement of pixel resolution. Circular register 60 is implemented in software and has a variable plurality of register locations 61. This variable plurality of register locations 61 is equal to the number of Bernoulli trials desired. Each register location 61 is accessed by register pointer 62. Each register location 61 is a location in the memory of processor 40 (FIG. 1) and contains 1) the pixel area from one video frame, 2) the sum of X moments from one video frame, and 3) the sum of Y moments from one video frame. The contents of each register 61 is updated each video frame.

A self-explanatory flow chart description of the software used in the processor 40 (FIG. 1) part of the statistical enhancement is illustrated in FIG. 10. This sequence is repeated for every video frame at a 30 Hz rate. In step 70, the software awaits the end of a video frame before proceeding to step 71 in which the sum of X moments, the sum of Y moments, and the pixel area are obtained through multibus 38 (FIG. 1) once each video frame. In step 72, the sum of X moments, the sum of Y moments, and the pixel area are written and overwritten into register locations 61 by register pointer 62, before it is incremented to the next register location 61 in step 73. In step 74, sums are calculated for all sum of X moments, sum of Y moments, and pixel areas stored in circular register 60. Step 74 performs the linear summation of the numerators and denominators of equations 5 and 6. Finally, in step 75, the sum of the sum of X moments is divided by the sum of pixel areas to obtain the X centroid coordinate; and the sum of the sum of Y moments is divided by the sum of pixel areas to obtain the Y centroid coordinate. These calculated centroid coordinates are the statistically enhanced coordinates, and are available at a 30 Hz rate even though they depend on approximately the last 1000 video frame measurements. After step 75 is completed, and the X and Y centroid coordinates are output to step 55 of FIG. 8, the software returns to step 70, and the sequence is repeated. As seen, the statistical enhancement of the present invention is implemented by a combination of hardware algorithm board 8 (FIG. 1) and the described software running in processor 40 (FIG. 1).

The current invention can be easily modified to simultaneously handle multiple beams in real time, such as the 96 beams of the Los Alamos Aurora Project. The modification requires division of the video image into multiple sectors (such as 96 sectors) where the centroid of the image in each of the sectors would be computed in real time. This is implemented by providing x and y pixel addresses as ROM addresses. ROM outputs are combined to form the sector number. The individual registers in the single centroid embodiment described above are replaced by arrays of registers implemented in a RAM addressed by the sector number.

The foregoing description of the embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An optical beam position determinator wherein a video camera captures an image of said beam in video frames comprising:
    interface means connected to said video camera for outputting said video image as pixels having determinable coordinates and magnitudes;
    magnitude determining means connected to said interface means for determining maximum, minimum, and average pixel magnitudes for said pixels within said video frames;
    threshold calculating means connected to said magnitude determining means for determining a threshold pixel magnitude from said maximum, minimum, and average pixel magnitudes;
    comparison means connected to said interface means and to said threshold calculating means for comparing each of said pixel magnitudes with said threshold pixel magnitude, and outputting coordinates of beam pixels whose magnitudes exceed said threshold pixel magnitude;
    pixel coordinate summing means receiving said coordinates of beam pixels for summing said coordinates of beam pixels;
    pixel area summing means receiving said beam pixels for counting said beam pixels to determine a total area covered by said beam pixels;
    calculating means receiving said total area and said sum of beam pixels whose magnitudes exceed said threshold pixel magnitude for calculating centroid coordinates for said total area and subtracting said calculated centroid from predetermined centroid coordinates.

2. The position determinator as described in claim 1, further comprising mechanical means connected to said calculating for repositioning said optical beam to a predetermined aligned position.

3. The position determinator as described in claim 1, further comprising discrimination means connected to said interface means for determining a predetermined area of said video frames from which said coordinates and magnitude of pixels are to be obtained, and outputting said area to said pixel coordinate summing means;

4. The position determinator as described in claim 3, wherein said predetermined area is 256 pixels by 256 pixels.

5. The position determinator as described in claim 1, wherein said interface means is implemented on a programmable logic device.

6. The position determinator as described in claim 2, wherein said mechanical means comprises motor controllers connected to stepper motors.

7. The position determinator as described in claim 1, wherein said pixel coordinate summing means comprises vertical pixel coordinate summing means and horizontal pixel coordinate summing means.

8. The position determinator as described in claim 1, wherein said calculating means comprises a computer.

9. The position determinator as described in claim 8, wherein said computer calculates said calculated centroid coordinates using system noise and Bernoulli trials to obtain enhanced resolution.

10. A method of determining the position of an optical beam wherein a video camera captures an image of said beam in video frames comprising the steps of:
   receiving and outputting said video images from said video camera as pixels having determinable coordinates and magnitudes;
   determining maximum, minimum, and average pixel magnitudes for said pixels within said pixel frames;
   determining a threshold pixel magnitude from said maximum, minimum, and average pixel magnitudes;
   comparing each of said pixel magnitudes of said video images with said threshold pixel magnitude and outputting coordinates of beam pixels whose magnitudes exceed said threshold pixel magnitude;
   summing said coordinates of beam pixels;
   summing said beam pixels to calculate a total area of said beam pixels;
   calculating centroid coordinates of said video image by dividing said sum of coordinates of beam pixels by said total area of said beam pixels;

11. The method as described in claim 10, wherein said step of calculating centroid coordinates further comprises subtracting said centroid coordinates from predetermined coordinates for an aligned position.

12. The method as described in claim 11 further comprising the step of producing an output to mechanical means for repositioning said optical beam to said aligned position.

* * * * *